(12) United States Patent
Sears et al.

(10) Patent No.: US 11,815,683 B2
(45) Date of Patent: Nov. 14, 2023

(54) DIMMING SHUTTER COMBINING GUEST-HOST LIQUID CRYSTAL AND PHOTOCHROMIC MATERIALS FOR AUGMENTED REALITY APPLICATIONS

(71) Applicant: Meta Platforms Technologies, LLC, Menlo Park, CA (US)

(72) Inventors: Jasmine Soria Sears, Kirkland, WA (US); Afsoon Jamali, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/722,138

(22) Filed: Apr. 15, 2022

(65) Prior Publication Data

US 2023/0028165 A1 Jan. 26, 2023

Related U.S. Application Data

(60) Provisional application No. 63/248,932, filed on Sep. 27, 2021, provisional application No. 63/233,136, filed on Aug. 13, 2021, provisional application No. 63/225,327, filed on Jul. 23, 2021.

(51) Int. Cl.
*G02B 27/01* (2006.01)
*G02B 26/04* (2006.01)
*G02F 1/00* (2006.01)

(52) U.S. Cl.
CPC ........... *G02B 27/0172* (2013.01); *G02B 26/04* (2013.01); *G02B 27/0101* (2013.01); *G02B 27/0179* (2013.01); *G02F 1/0045* (2013.01); *G02B 2027/0118* (2013.01); *G02F 2201/086* (2013.01); *G02F 2201/44* (2013.01)

(58) Field of Classification Search
CPC .................................................. G02F 1/0045
See application file for complete search history.

(56) References Cited

U.S. PATENT DOCUMENTS

2020/0111258 A1  4/2020  Sears et al.
2020/0111259 A1*  4/2020  Sears et al. ........ G02B 27/0172

FOREIGN PATENT DOCUMENTS

WO  0077559 A1  12/2000

OTHER PUBLICATIONS

EPO - International Search report and Written Opinion for International Application No. PCT/US2022/038097, mailed Oct. 27, 2022, 11 pages.

* cited by examiner

*Primary Examiner* — Edmond C Lau
(74) *Attorney, Agent, or Firm* — McDermott Will & Emery LLP

(57) ABSTRACT

A headset for augmented reality applications is provided. The headset includes at least one eyepiece configured to provide a see-through image to a user via a transparent optical component, and to provide an artificial image through a display, and a dimming shutter configured to adjust a transparency level of the transparent optical component. The dimming shutter further includes an active liquid crystal layer configured to adjust a transparency level according to an electrical power provided between two electrodes, and a photoactive layer configured to adjust the transparency level upon absorption of an ultraviolet radiation for a selected period of time. A default orientation of a host material in the active liquid crystal layer may be in a dark state or in a clear state, when no electrical power is provided. A method and a memory storing instructions to execute the method for use of the above device are also provided.

14 Claims, 17 Drawing Sheets

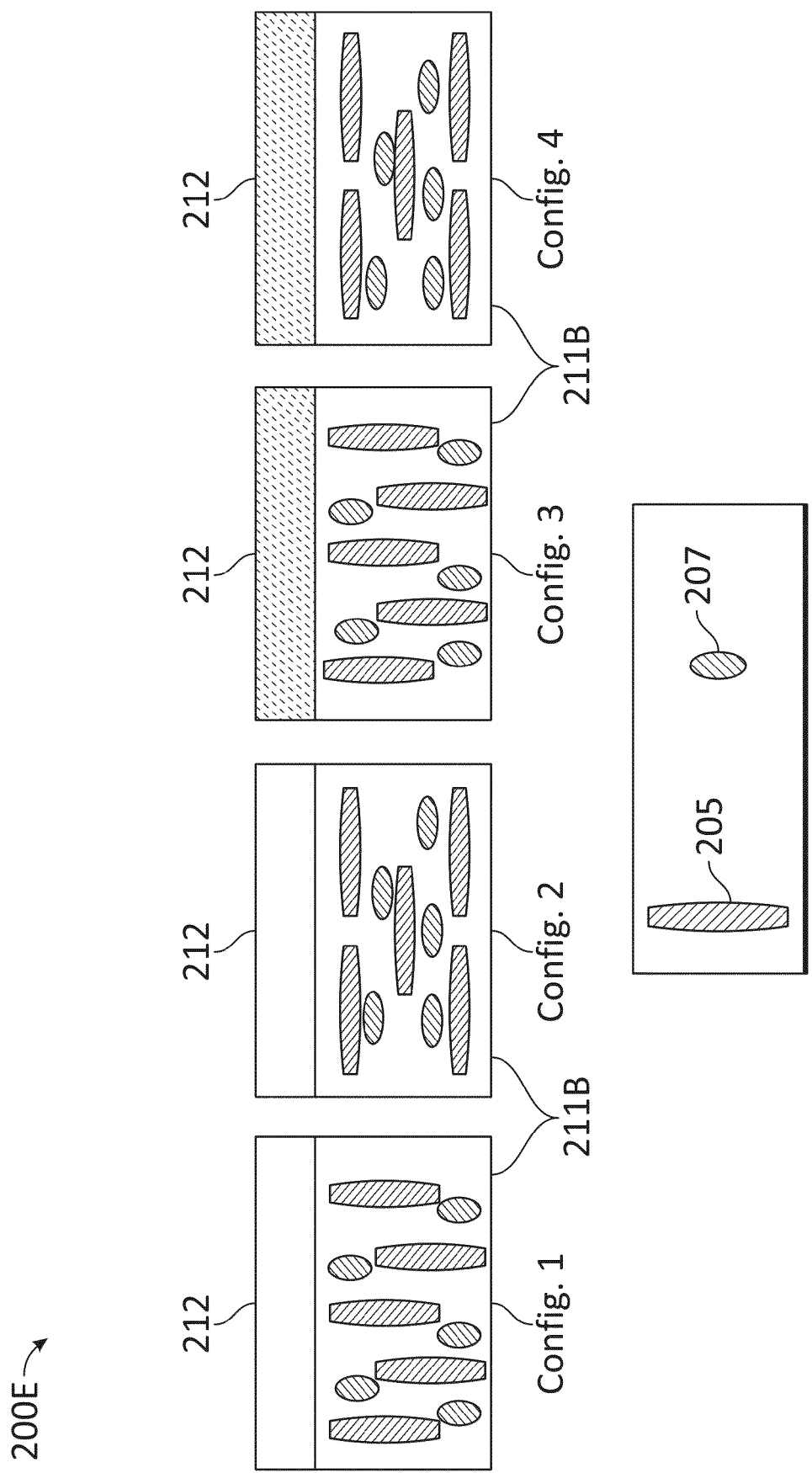

DIMMING SHUTTER COMBINING GUEST-HOST LIQUID CRYSTAL AND PHOTOCHROMIC MATERIALS FOR AUGMENTED REALITY APPLICATIONS

CROSS-REFERENCE TO RELATED APPLICATION

The present disclosure claims priority under 35 U.S.C. §119(e) and is related to U.S. Provisional Applications 63/225327, entitled IDEAL COMBINED GH-PhCh System; filed on Jul. 23, 2021; 63/233136, entitled COMBINED GH-PhCh System, filed on Aug. 13, 2021; and 63/248932, entitled DIMMING SHUTTER COMBINING GUEST-HOST LIQUID CRYSTAL AND PHOTOCHROMIC MATERIALS FOR AUGMENTED REALITY APPLICATIONS, filed on Sep. 27, 2021, all to Jasmine SEARS et-al., the contents of which are hereby incorporated by reference, in their entirety, for all purposes.

BACKGROUND

Field

The present disclosure is related to automatic dimming shutters for use in smart glasses and other augmented reality (AR) applications. More specifically, the present disclosure is related to dimming shutters combining guest-host liquid crystal (GHLC) active layers and photochromic (PhCh) layers to provide low power, fast, and high dynamic range transparency levels for headsets and smart glasses in AR applications.

Related Art

Typical shutter solutions available to adjust the transparency level of an eyepiece or lens tend to consume too much power, and offer a low dynamic range of transparency, normally with low transmission in the clear state and low opacity in the dark state. Some solutions that use PhCh materials may offer a wider dynamic range with a high transmission in the clear state and high opacity in the dark state, but the response of these materials is temperature dependent, and do not work indoors. For AR applications, it is desirable to have shutters that can operate both indoors and outdoors, be fast, offer a wide dynamic range of transparency, and are power efficient.

BRIEF DESCRIPTION OF THE DRAWINGS

FIGS. 2A-2E illustrate shutters for AR headsets including a GHLC layer, a PhCh layer, and a combination thereof, according to some embodiments.

In the figures, elements having the same or similar features are designated with the same or similar reference numerals, unless explicitly stated otherwise.

SUMMARY

Figure 1:
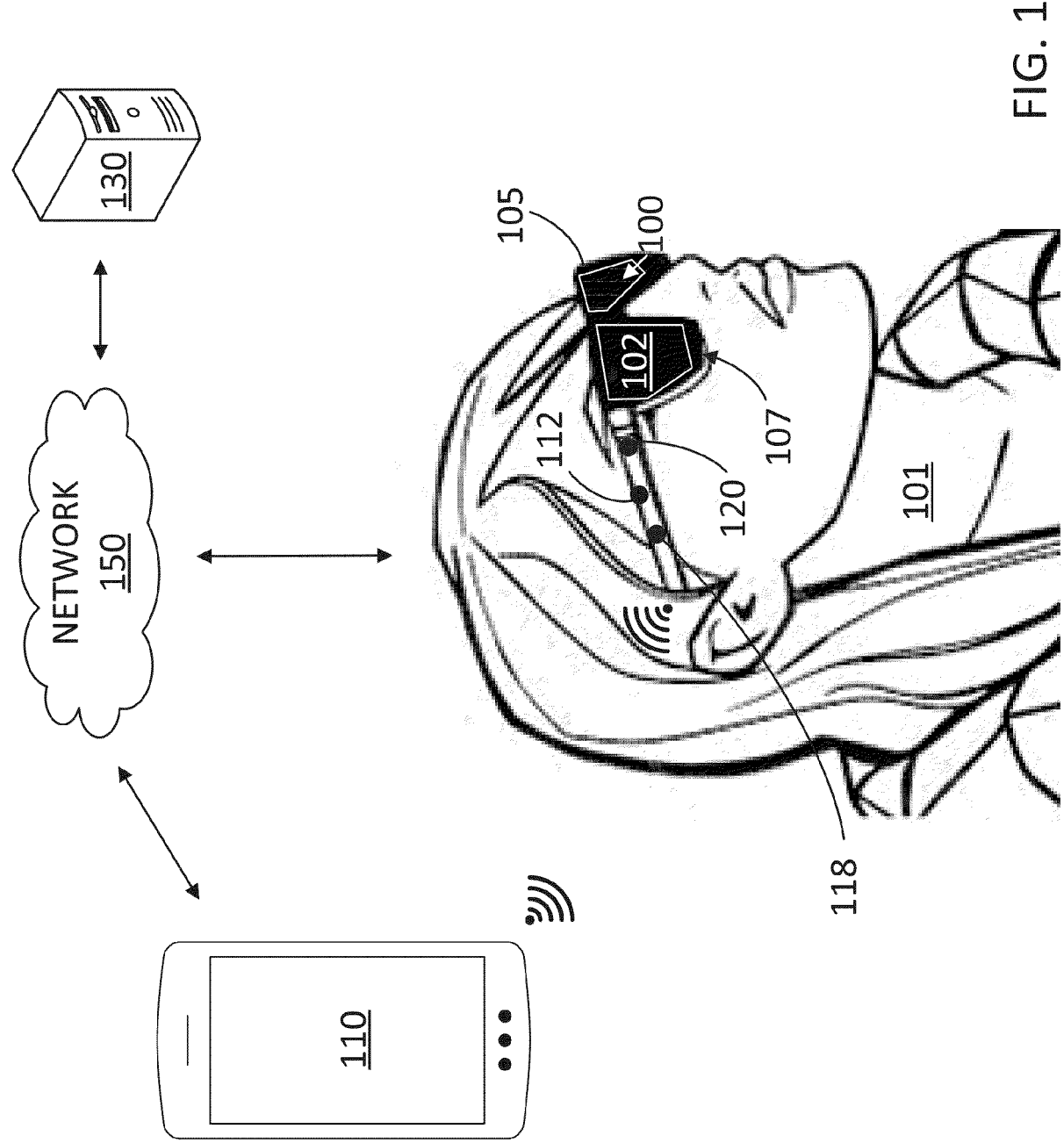
FIG. 1 illustrates a user of an augmented reality headset (e.g., smart glasses), according to some embodiments.

A dimming shutter includes an active liquid crystal layer configured to adjust a transparency level according to an electrical power provided between two electrodes, and a photoactive layer configured to adjust the transparency level upon absorption of an ultraviolet radiation for a selected period of time, wherein a default orientation of a host material in the active liquid crystal layer is selected to be in a dark state or in a clear state, when no electrical power is provided.

A headset for augmented reality applications includes at least one eyepiece configured to provide a see-through image to a user via a transparent optical component, and to provide an artificial image through a display. The headset also includes a dimming shutter configured to adjust a transparency level of the transparent optical component, the dimming shutter further includes an active liquid crystal layer configured to adjust a transparency level according to an electrical power provided between two electrodes, and a photoactive layer configured to adjust the transparency level upon absorption of an ultraviolet radiation for a selected period of time, wherein a default orientation of a host material in the active liquid crystal layer is selected to be in a dark state or in a clear state, when no electrical power is provided.

A computer-implemented method for using a dimming shutter for a headset in augmented reality applications includes determining a desired transparency level in a headset for augmented reality applications, based on an environmental configuration, applying an electrical power to an active liquid crystal layer in a shutter for an eyepiece of the headset, based on the desired transparency level and a power setting of the headset, and exposing the headset to an ultraviolet radiation for a selected period of time, based on the desired transparency level and the power setting of the headset. The computer-implemented method also includes adjusting the electrical power to the active liquid crystal layer in the shutter in response to a change in the environmental configuration.

DETAILED DESCRIPTION

In AR applications, a headset or smart glass typically handles a computer-generated (e.g., virtual) image, in combination with a see-through (e.g., real) image provided via optical components such as eyepieces and the like. Real images typically have a high variability in brightness, depending on environmental conditions (e.g., whether the user is indoors or outdoors, in a car, in a bright sunny day, or an overcast day, or at night), and therefore it becomes desirable to adjust the brightness of the real image to a high degree of accuracy to pair it up with the brightness of the virtual image. Given the mobility of AR headsets and smart glasses, it is desirable that any electronic control be provided in a compact form factor and be highly efficient in power consumption.

PhCh materials are known to increase their form factor upon absorption of ultraviolet (UV) radiation. Hereinafter, ultraviolet radiation will be understood as electromagnetic radiation having a wavelength that is smaller than about 400 nanometers (nm). More specifically, ultraviolet radiation as disclosed herein may include electromagnetic radiation having a wavelength between about 100 nm, or less, and about 400 nm. Accordingly, an eyepiece that includes a layer of PhCh material becomes opaque in the presence of UV radiation. The resonant frequency changes when PhCh molecules change shape. Accordingly, in the absence of UV radiation, visible light is not resonant with the PhCh molecule and therefore is not absorbed (clear state). In the presence of UV radiation, visible light is resonant with the PhCh molecules and does get absorbed. Thus, the optical cross-section is only a meaningful concept when the PhCh molecule is in the dark (post-UV-absorption) state. And the PhCh molecules in the presence of UV radiation will absorb more light than in the absence of UV radiation regardless of the physical orientation of the PhCh molecules. This effect is desirable as it involves no electrical power consumption and the transparency range between a clear state and a dark state can be large (e.g., a high transparency in the clear state and a high opacity in the dark state). One caveat of PhCh materials is that they are temperature-sensitive, and may lack a desirable tint level for the environment. Furthermore, they are not operational indoors, or in a car (where the windows may have UV reflecting coating). GHLC active layers are faster than PhCh materials, and can operate indoors and outdoors, but typically have a low dynamic range with lower transmission in the clear state and lower opacity in the dark state. One advantage of GHLC active layers is the controllable dimming that can be produced by a differentiated scattering effect of the LC molecules when oriented along, or transversal with respect to the direction of light propagation.

Embodiments as disclosed herein solve the above problems by providing dimming shutters that combine GHLC active layers with PhCh materials to benefit from both. A dimming shutter as disclosed herein can operate both indoors and outdoors, and can be fine-tuned based on the environment and AR content. In addition, by combining GHLC active layers with PhCh materials, dimming shutters as disclosed herein have a more stable performance over a wide range of temperatures, and offer greater homogeneity across the eyepiece in the presence of a temperature gradient.

FIG. 1 illustrates a user 101 of an AR headset 105 (e.g., smart glasses), according to some embodiments. Headset 105 may be communicatively coupled with a mobile device 110 (e.g., a smart phone, palm device, laptop, and the like) for the user, via an electromagnetic (EM) signal (e.g., radio-frequency signal, Wi-Fi, Bluetooth, and the like), and to a remote server 130 via a network 150 through a communications module 118. Headset 105 may also include a memory 120 storing instructions, and one or more processors 112 to execute the instructions and perform, at least partially, one or more steps as in methods as disclosed herein.

Headset 105 may include a display 102 configured to provide a virtual image to user 101. The virtual image may be generated by processor 112, or may be provided by mobile device 110 or server 130. The virtual image is superimposed to a see-through image in at least one of eyepieces 107. To control the visibility of the virtual image and the see-through image, eyepieces 100 in headset 105 have a shutter 100 to dim the transparency level of the headset based on ambient light conditions and certain configurations of the display. In some configurations, it may be desirable to dim the see-through image so as to enhance the visibility of the virtual image. In some configurations, it may be desirable to make the see-through image as clear as possible.

In yet some other embodiments, headset 105 may not include display 102, or it may be turned off. However, user 101 may desire to adjust the brightness of the see-through image with shutter 100.

FIGS. 2A-2E illustrate shutters 200A-1, 200A-2, 200B-1, 200B-2, 200C, and 200E (hereinafter, collectively referred to as "shutters 200A, 200B, 200C and 200") for AR headsets including PhCh layers 212A and 212B (hereinafter, collectively referred to as "PhCh layers 212"), GHLC layers 211A and 211B (hereinafter, collectively referred to as "GHLC layers 211"), and a combination thereof (combination layer 210), according to some embodiments. The panels show different configurations, namely: a power 221 OFF, no UV 222 ( "config. 1"); power 221 ON, no UV 222 ("config. 2"); power 221 OFF, UV 222 ("config. 3"); and power 221 ON with UV 222 ("config. 4"), with progressively increasing opacity.

Figure 2A:
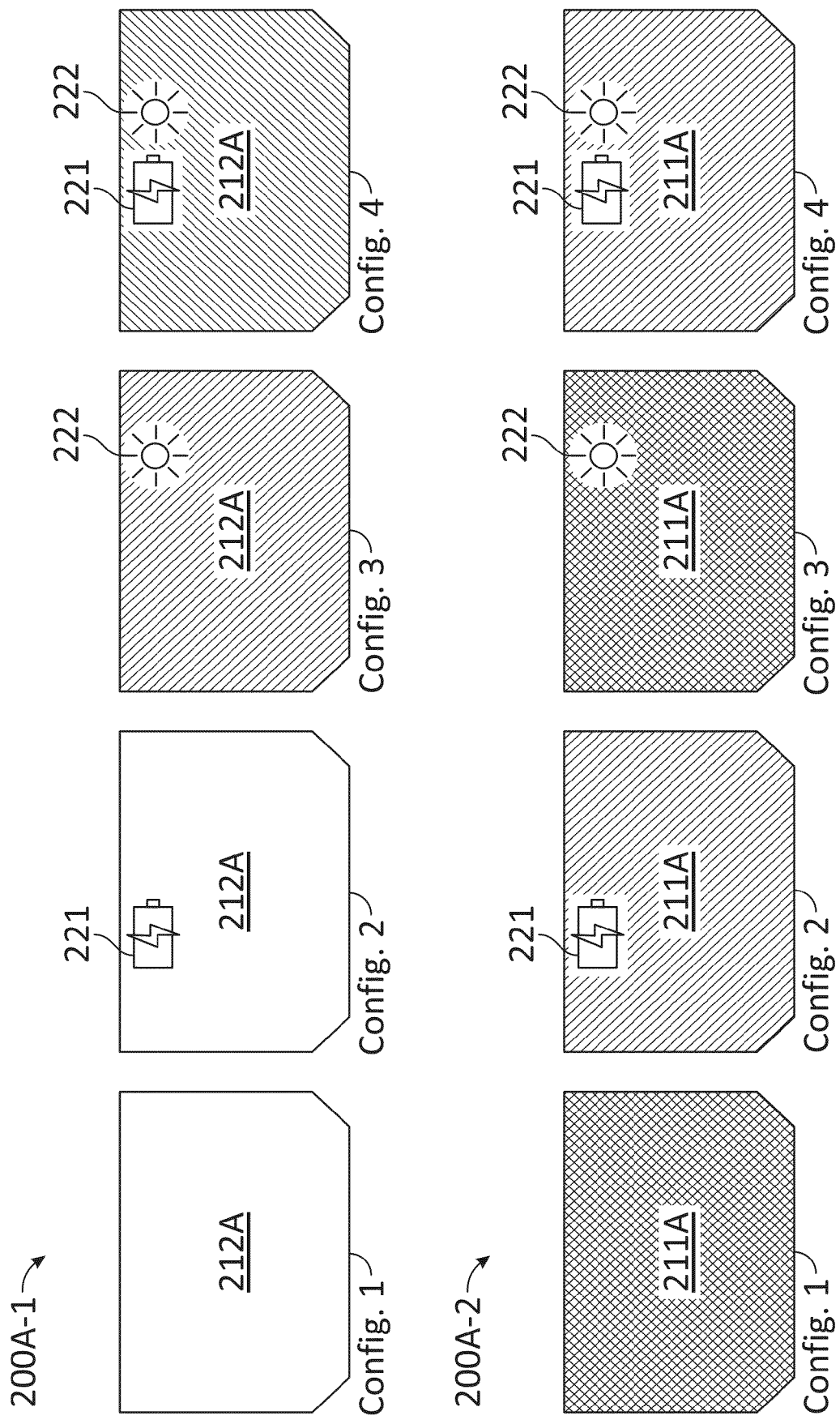
Figure 2B:
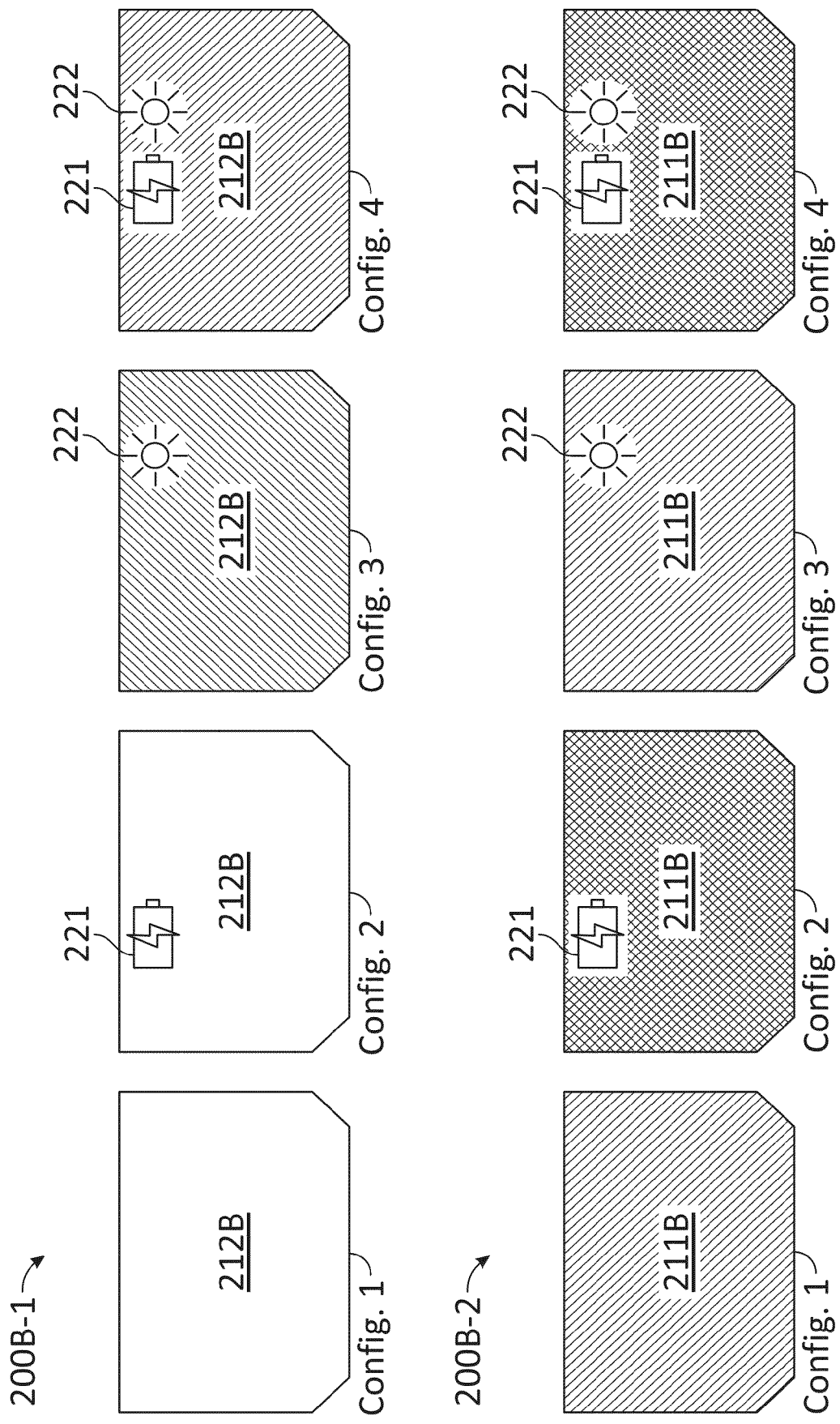

FIGS. 2A-2B illustrate the performance of GHLC layers 211 and PhCh layers 212 separately, under the above four conditions. A default state under config. 1 for PhCh layer 212A in shutter 200A-1 and GHLC layer 211A in shutter 200A-2, is "clear." A default state under config. 1 of PhCh layer 212B is "clear." And a default state under no electrical power 221 of GHLC layer 211B is "dark" and under electrical power 221 is "clear." Note that in the absence of UV radiation 222, PhCh layers 212 are clear even at no power 221 because the PhCh molecules have not changed their form factor (no UV absorption) and are therefore transparent to light.

Figure 2C:
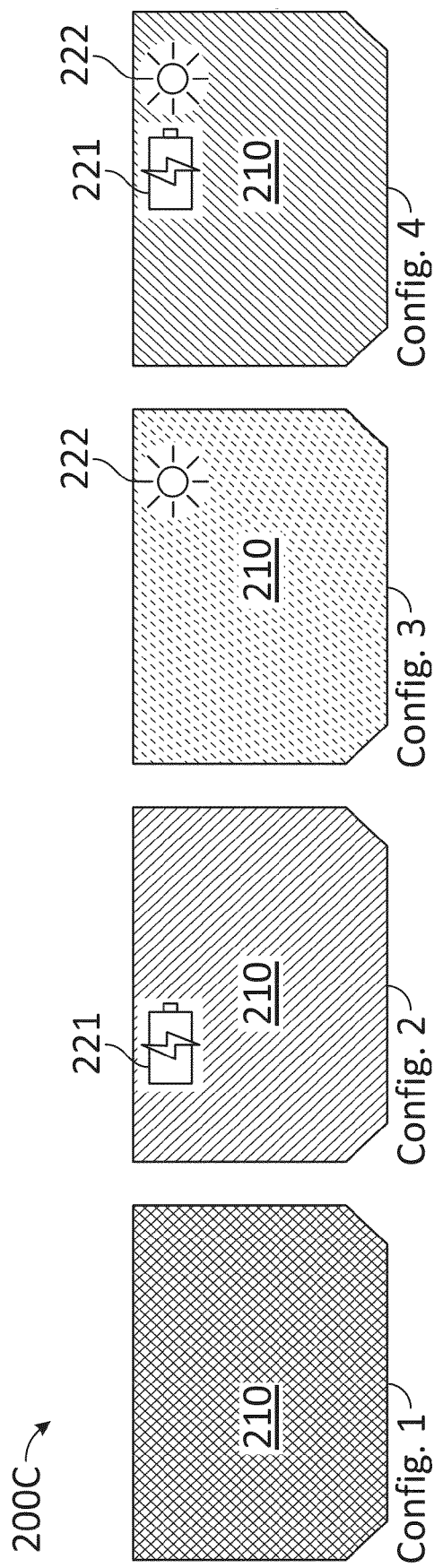
Figure 2D:
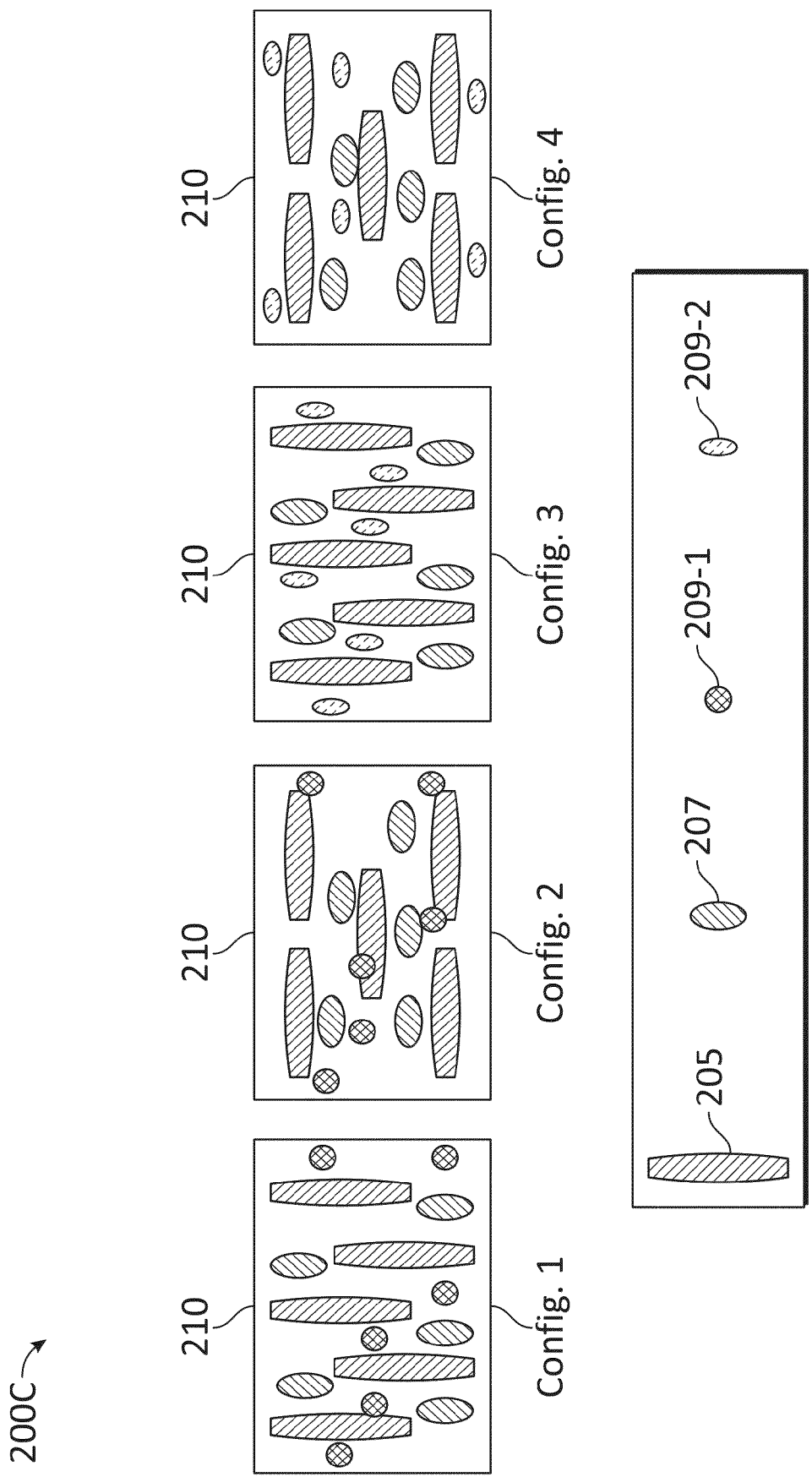

FIGS. 2C and 2D show a shutter 200C with combination layer 210 in a normally clear state (e.g., in config. 1), according to some embodiments. In some embodiments, it is desirable to place GH molecules 205, LC molecules 207, and PhCh molecules (inactive 209-1, activated 209-2, and collectively referred to as "PhCh molecules 209") in combination layer 210. This creates a synergistic effect wherein activated PhCh molecules 209-2 re-orient themselves along GH molecules 205 when power 221 is ON. This enhances the darkening effect of PhCh molecules 209, which are normally unresponsive to power 221 when placed on a separate layer of their own.

FIG. 2D illustrates a cross-sectional view of shutter 200C, for each one of configurations 1, 2, 3, and 4 in the combined active layer 210. Shutter 200C achieves a transparency range from a dark state with about 8% light transmission (config. 4) to a clear state of about 90% light transmission (config. 1).

In some embodiments, shutter 200C exhibits a transition time from configuration 1 to configuration 2 that may take less than one hundred (100) milliseconds (ms) to reach approximately 50% light transmission. The reverse transition from configuration 2 to configuration 1 may take about the same time to reach a 90% transmission. A transition from configurations 1 or 2 to configurations 3 or 4 may follow a Logistic curve behavior, with about thirty (30) seconds to achieve about 30% light transmission. The reverse transition from configurations 3 or 4 to configurations 1 or 2 also follow a Logistic curve, and may take about three (3) minutes to achieve 90% transmission. A transition from configuration 1 to configuration 4 may take about 100 ms to reach 50% light transmission and about thirty (30) seconds to reach about 8% transmission. The reverse transition from configuration 4 to configuration 1 may take about one hundred (100) ms to reach 30% light transmission, and about three (3) minutes to reach 90% light transmission.

FIG. 2E illustrates a layered shutter 200E that combines a GHLC layer 211B adjacent to PhCh layer 212, according to some embodiments. GHLC layer 211B includes GH molecules 205 and LC molecules 207. With no power and no UV (config. 1), GHLC layer 211B and PhCh layer 212 present a clear substrate and shutter 200E has maximum transparency. With power ON, but no UV (config. 2), GHLC layer 211B-2 presents a daker substrate, combined with a clear PhCh layer 212-1. With power OFF, in the presence of UV (config. 3), GHLC layer 211B-1 is clear, but PhCh layer 212-2 is dark. With power ON and in the presence of UV radiation (config. 4), GHLC layer 211B-2 is dark and so is PhCh layer 212-2. Accordingly, the different combination of power/UV factors results in a progressively increasing opacity of layered shutter 200E. In a clear state, layered shutter 200E has a light transmission of about 90%. When fully 'on' (power ON in the presence of UV radiation), layered shutter 200E achieves a dark state with about 11% transmission.

FIGS. 3A-3D illustrate detailed cross-sectional views of a combination layer 310 of combined shutter 300 under configurations 1, 2, 3, and 4, according to some embodiments. Configuration 1 includes a power OFF, and no UV radiation present on combination layer 310. Configuration 2 includes a power 321 ON, no UV radiation present in combination layer 310. Configuration 3 includes power OFF in the presence of UV radiation 322. And configuration 4 includes power 321 ON in the presence of UV radiation 322. Combination layer 310 includes GH molecules 305, polymerized LC molecules 306, a dichroic dye 307, inactive PhCh molecules 309-1, and activated PhCh molecules 309-2 (hereinafter, collectively referred to as "PhCh molecules 309"). Combined shutter 300 shows a progressively increasing opacity from configuration 1 through 4, as follows. An input light 331 goes through combination layer 310 and under the different configurations results in a varying intensity of throughput light 332A, 332B, 332C, and 332D (hereinafter, collectively referred to as "throughput light 332").

In some embodiments, polymerized LC molecules 306 reduce the response time (e.g., increase the speed) of dichroic dye 307 (e.g., when power 321 is ON) and also of activated PhCh molecules 309-2 (e.g., in the presence of UV radiation 322) to align in a direction perpendicular to input light 331 (e.g., to reduce throughput light 332).

Figure 3A:
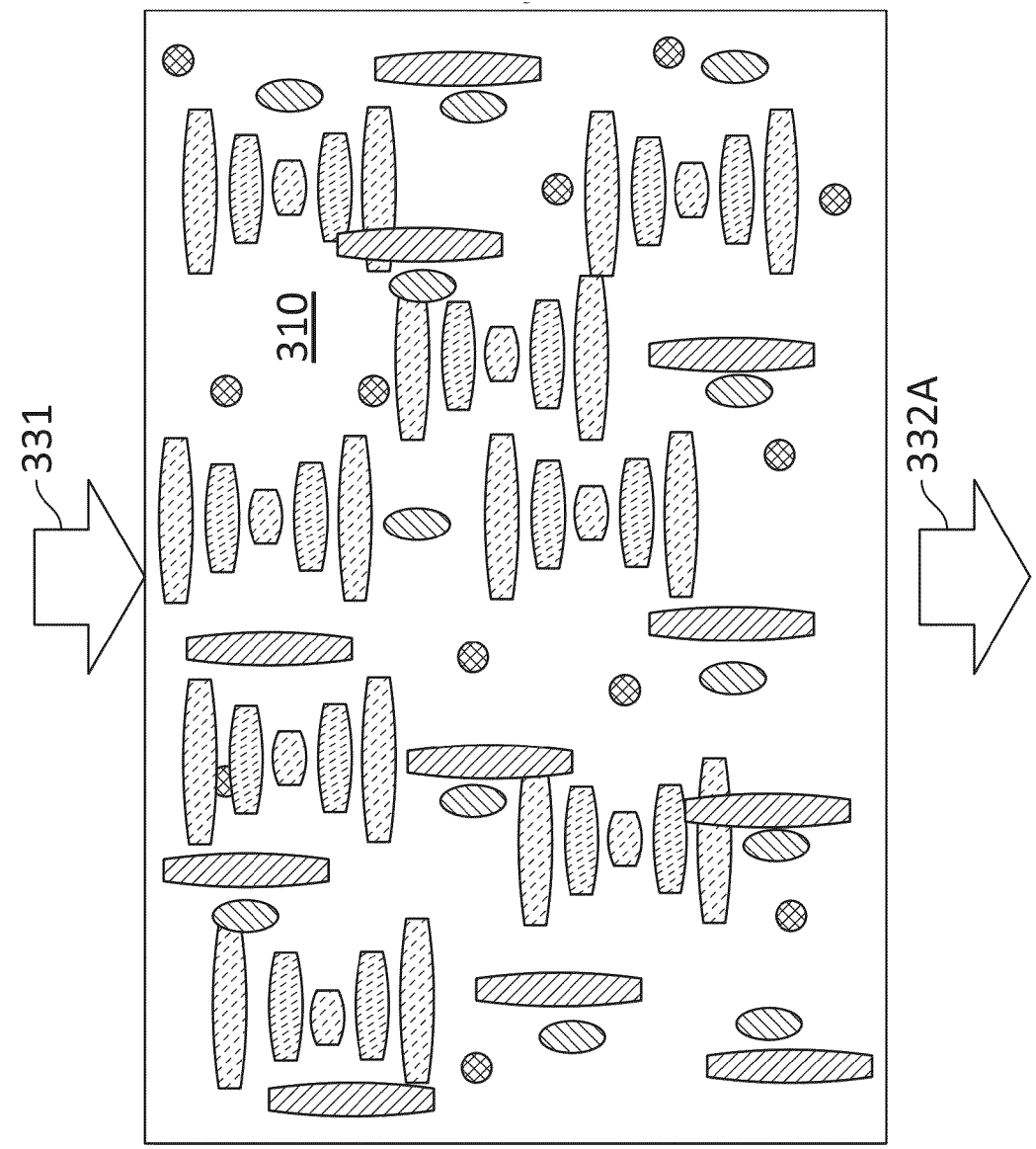
FIGS. 3A-3D illustrate a detailed cross-sectional view of a combined shutter under different configurations, according to some embodiments.
Figure 3A:
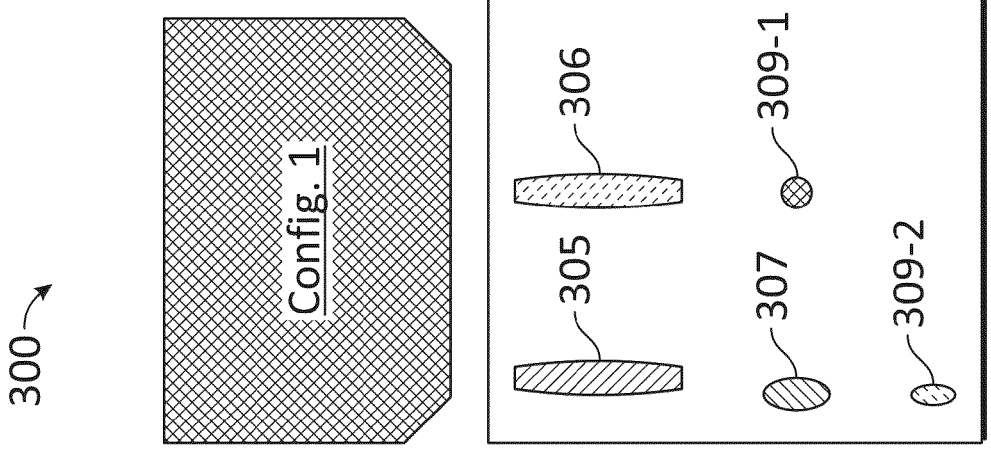

FIG. 3A illustrates the effect of configuration 1 on the transparency level of combination layer 310. In the absence of power, GH molecules 305 and dichroic dye 307 are aligned along the direction of input light 331. In the absence of UV radiation, PhCh molecules retain a small cross section. Accordingly, a small amount of input light 331 is absorbed, scattered, or blocked and throughput light 332A is similar in intensity to input light 331, resulting in a high transparency level. One advantage of GHLC active layers is the controllable dimming that can be produced by a greater scattering effect of LC molecules 306 when oriented transversally with respect to the direction of input light 331.

Figure 3B:
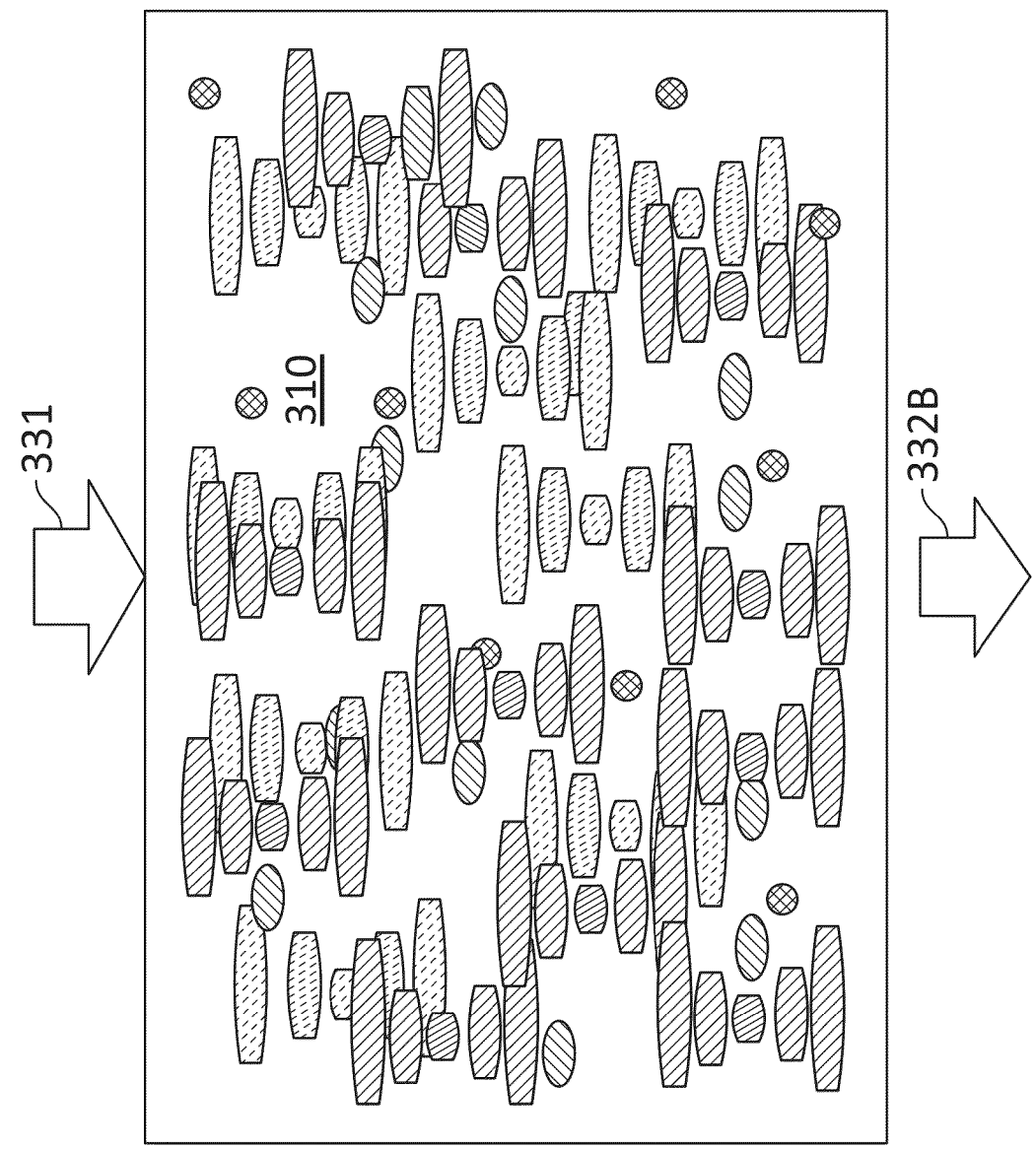
Figure 3B:
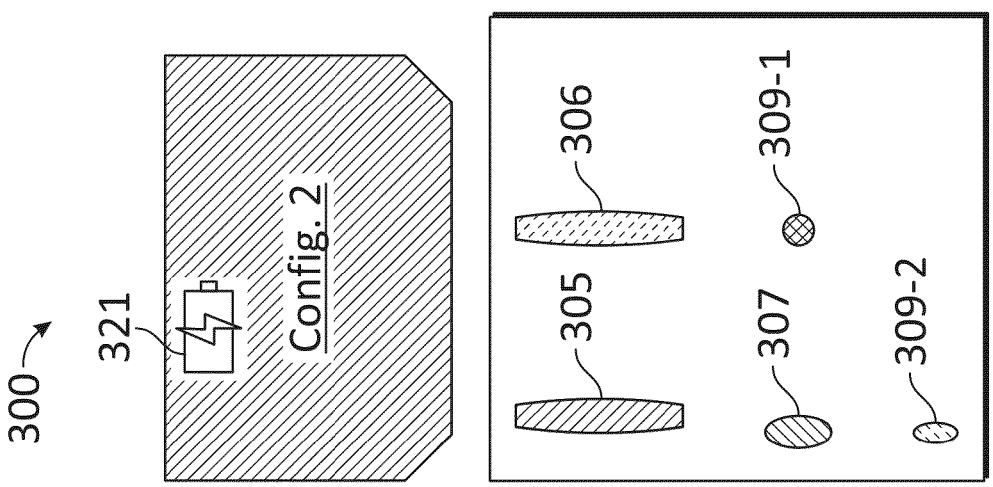

FIG. 3B illustrates the effect of configuration 2 on the transparency level of combination layer 310. In the presence of power 321, GH molecules 305 and dichroic dye 307 are aligned perpendicularly to the direction of input light 331. Accordingly, a larger amount of input light 331 is absorbed, scattered, or blocked by dichroic dye 307, compared to configuration 1. Thus, throughput light 332B has a lower intensity than input light 331, resulting in a lower transparency level, compared to configuration 1. In the absence of UV radiation, PhCh molecules retain a small cross section and have little to no effect on the transparency level of configuration 2.

Figure 3C:
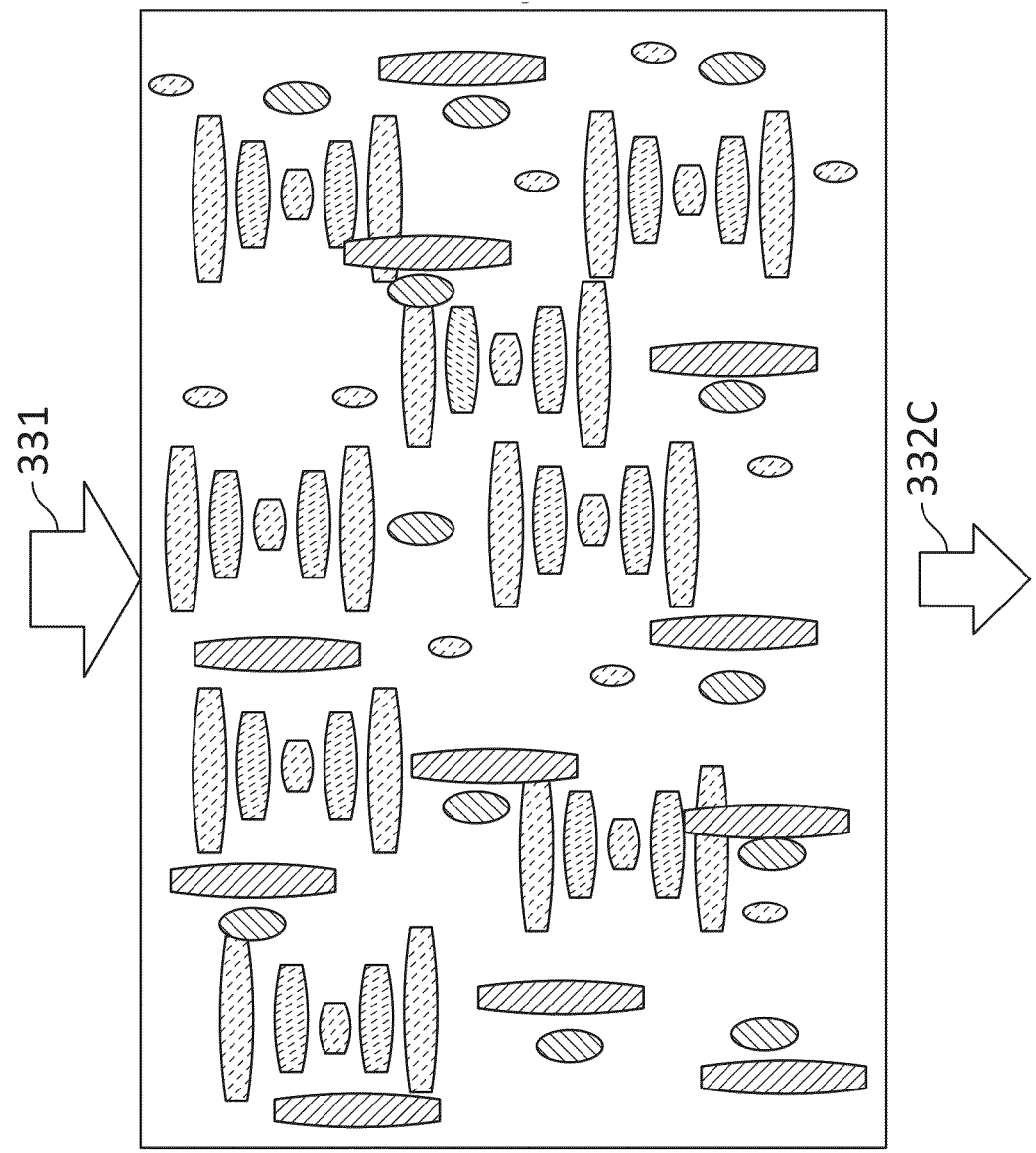
Figure 3C:
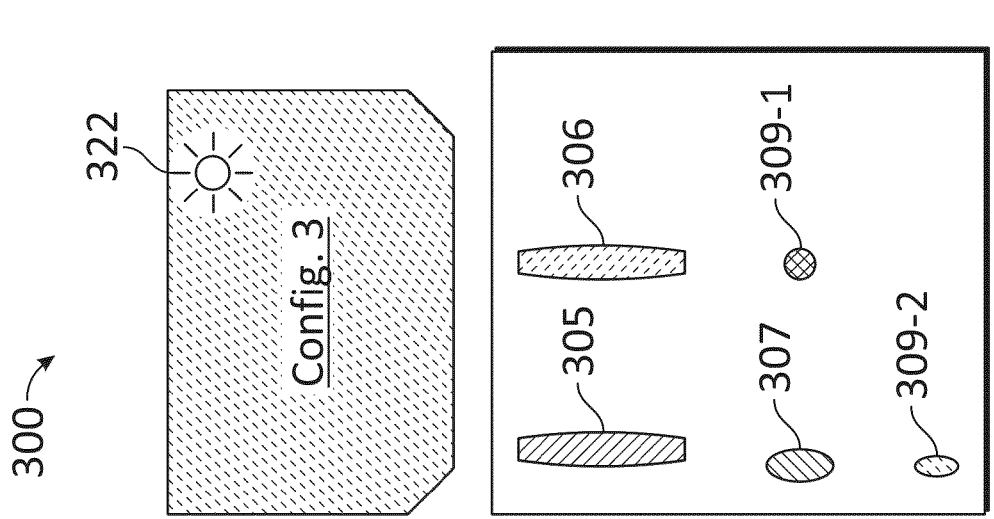

FIG. 3C illustrates the effect of configuration 3 on the transparency level of combination layer 310. In the absence of power, GH molecules 305 and dichroic dye 307 are aligned along the direction of input light 331. In the presence of UV radiation 322, activated PhCh molecules 309-2 swell to a large cross section, and are aligned parallel to input light 331 by GH molecules 305. Accordingly, an amount of input light 331 is absorbed, scattered, or blocked and throughput light 332A is lower in intensity than input light 331, resulting in a lower transparency level than configuration 1 or 2.

Figure 3D:
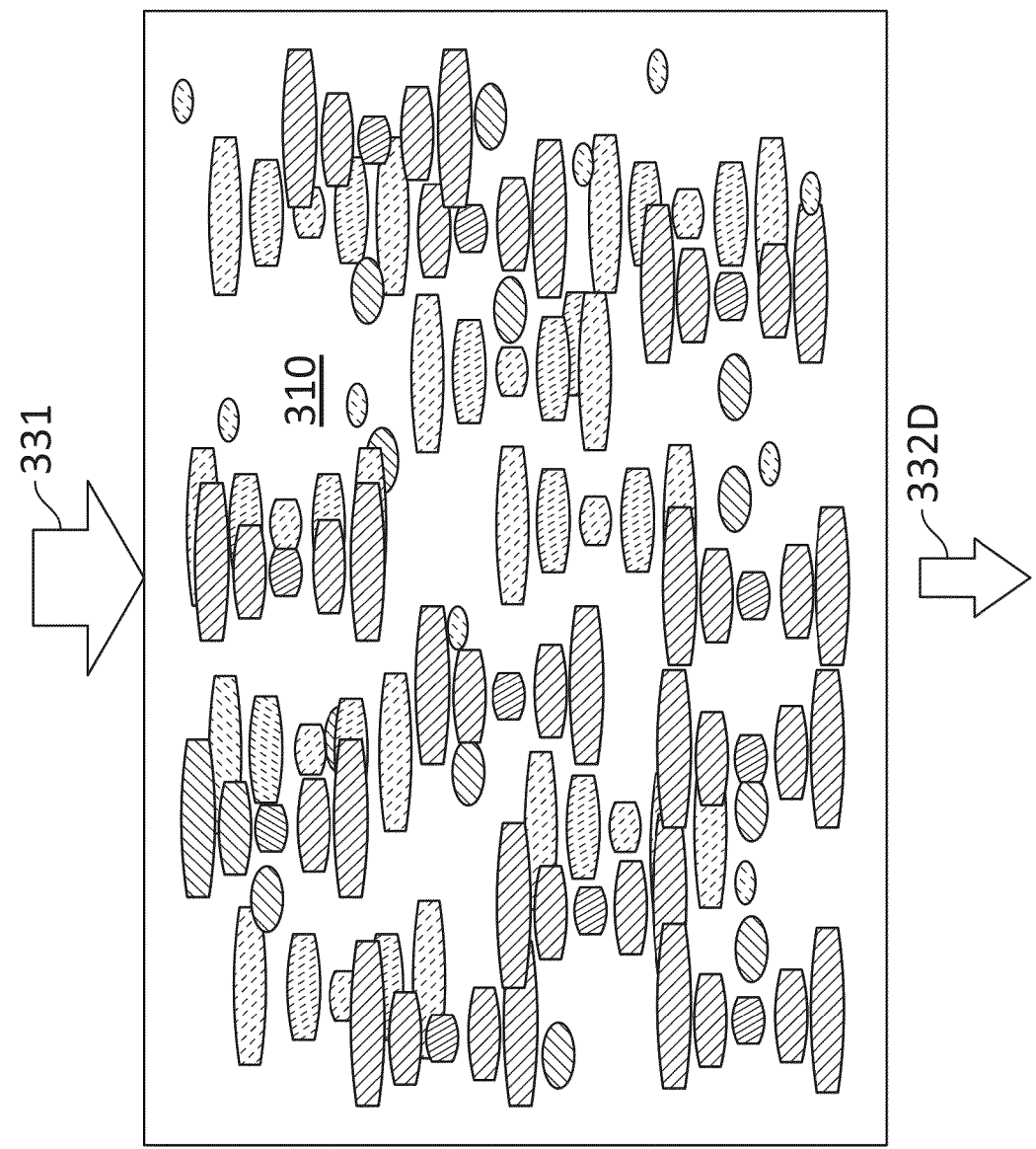
Figure 3D:
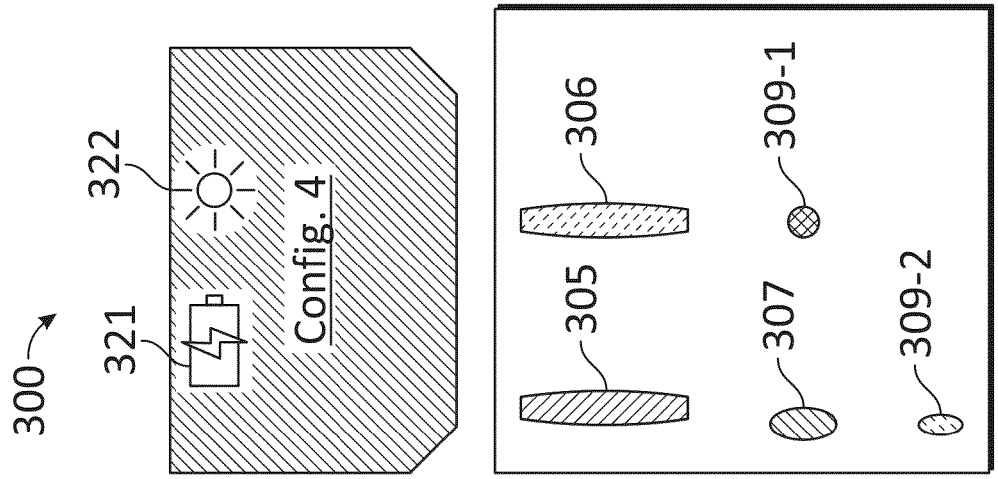

FIG. 3D illustrates the effect of configuration 4 on the transparency level of combination layer 310. With power 321 ON, GH molecules 305 and dichroic dye 307 are aligned perpendicularly to the direction of input light 331. In the presence of UV radiation 322, PhCh molecules 309 become activated PhCh molecules 309-2. Polymerized LC molecules 306 force activated PhCh molecules 309-2 to align perpendicularly to the direction of input light 331, as well. Accordingly, a large amount of input light 331 is absorbed, scattered, or blocked by dichroic dye 307 and activated PhCh molecules 309-2. Throughput light 332D has the lowest intensity of all configurations, resulting in a low transparency level.

Figure 4A:
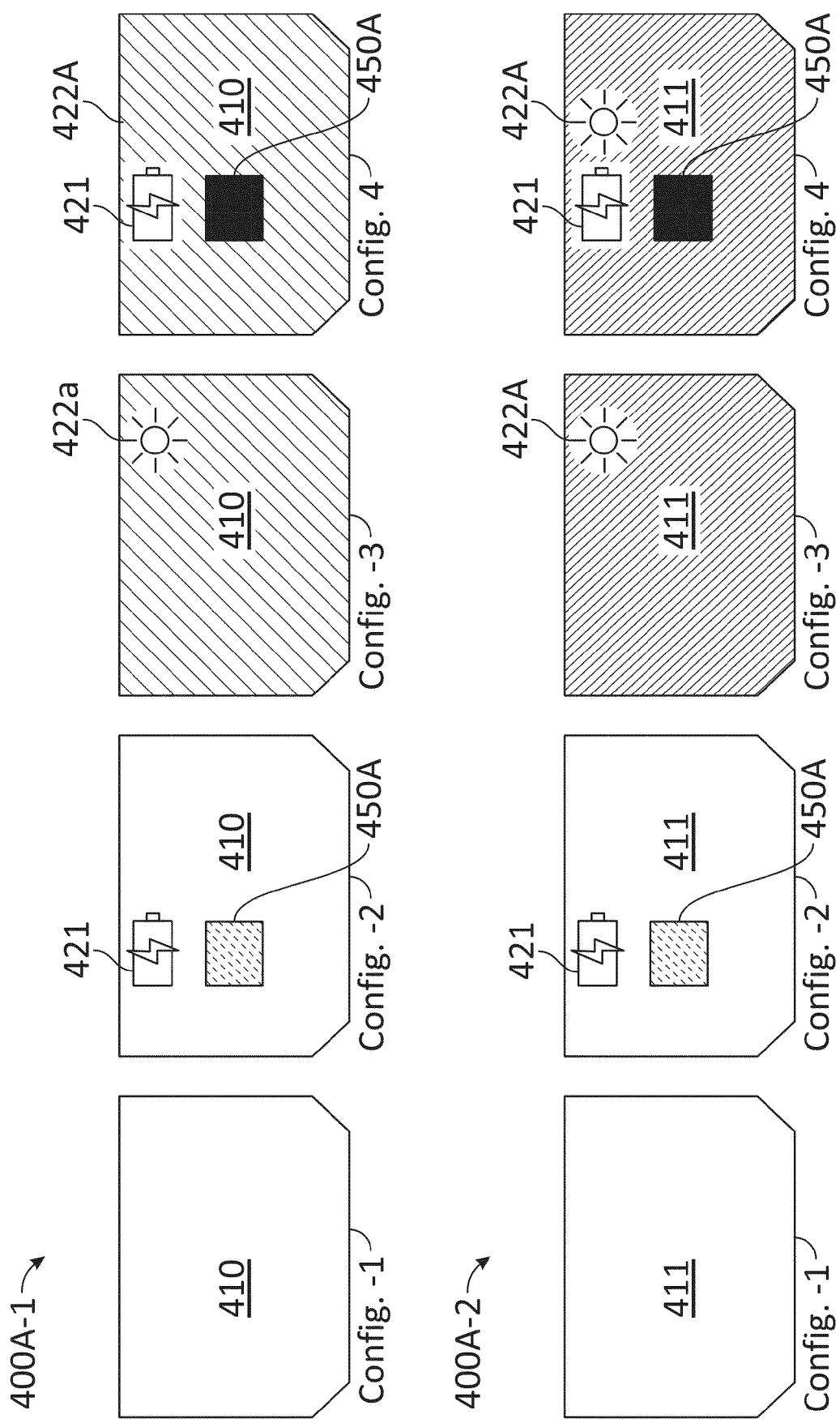
FIGS. 4A-4B illustrate the performance and cross section of a pixelated shutter, according to some embodiments.
Figure 4B:
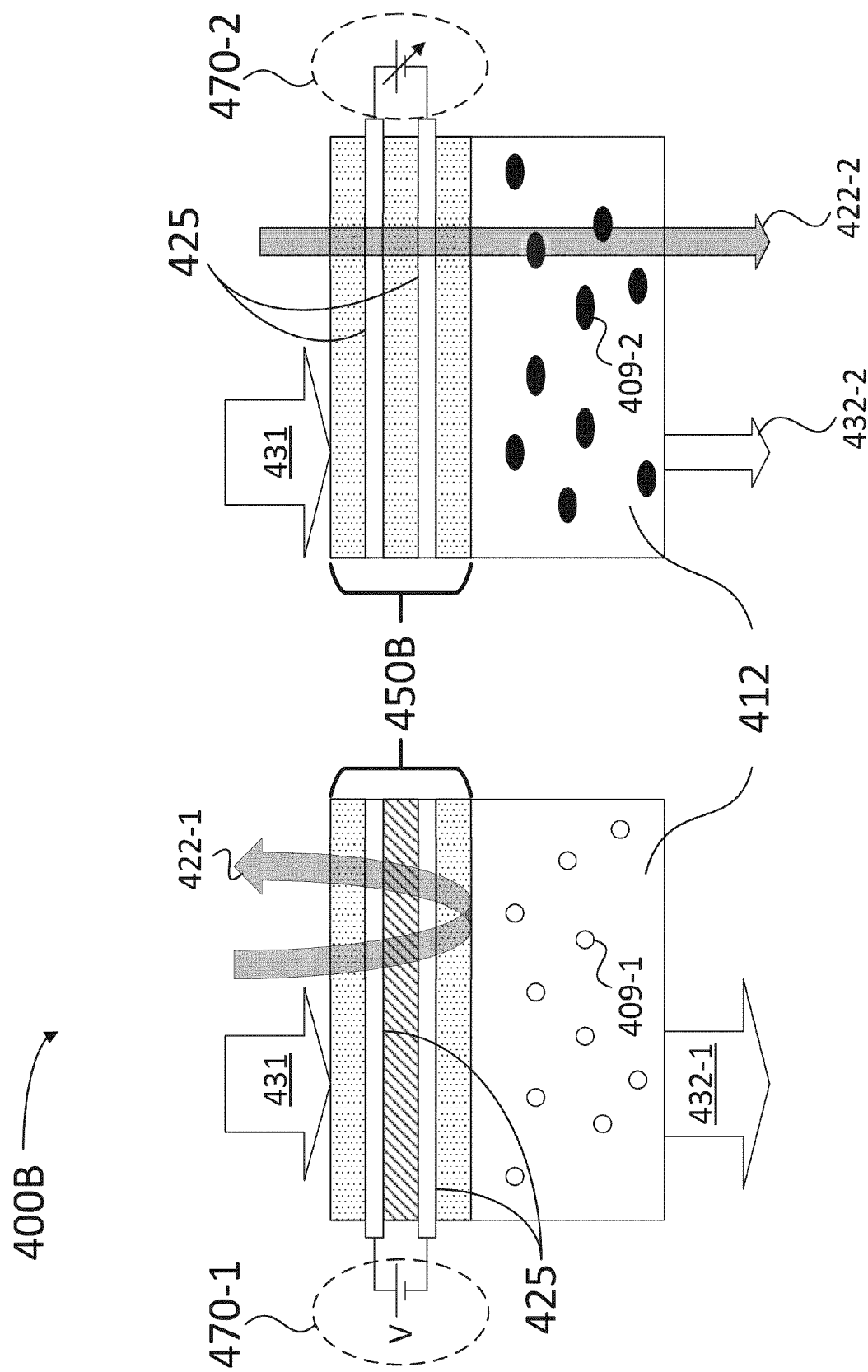

FIGS. 4A-4B illustrate the performance and cross section of pixelated shutters 400A-1, 400A-2, and 400B (hereinafter, collectively referred to as "pixelated shutters 400A," and "400"), according to some embodiments. In a first embodiment, pixelated shutter 400-1 may include a combined layer 410 of GHLC molecules and PhCh molecules. In a second embodiment, pixelated shutter 400 may be a conjoined layer 411 including a first layer of PhCh molecules and a second layer of GHLC molecules. Pixelated shutters 400A may operate in configuration 1 with no power and the absence of UV radiation. A configuration 2 includes power 421 in the absence of UV radiation. A configuration 3 includes no power in the presence of UV radiation 422A, 422-1 and 422-2 (hereinafter, collectively referred to as "UV radiation 422"). And configuration 4 includes power 421 and the presence of UV radiation 422, with progressively increasing opacity. Pixelated shutters 400 can have a transparency adjustable layer divided into separately addressable pixels 450A. Accordingly, the transparency of selected portions in the eyepiece can be switched independently of the rest, taking advantage of the localized, controllable dimming produced by a differentiated scattering effect of the LC molecules when oriented along, or transversal with respect to the direction of light propagation within the area of a single pixel.

In some embodiments, combined layer 410 shows some darkening over the entire shutter in the presence of UV radiation 422, with switched pixels 450 darkening even further. Conjoined layer 411 would darken more than combined layer 410 in the presence of UV radiation 422, with switched pixels 450A darkening further, but not by as much as in the combined shutter design. The operation of switched pixels 450A on GHLC layers is a direct implementation of the power ON/OFF mechanism for these materials by appropriate segmentation of the electrodes used to provide power.

To have an improved pixelated effect on a PhCh layer 412, a pixelated shutter 400B includes a Bragg reflector 450B that is switchable. Bragg layer 450B may include multiple layers of LC molecules sandwiched between electrodes 425. The LC layers in Bragg reflector 450B have a thickness tuned to be operative in the UV wavelength range (e.g., about 190 nm to 400 nm), while substantially transparent in the visible wavelength range (e.g., about 450-750 nm). When a voltage 470-1 is provided between electrodes 425, a generated electric field alters the effective index of refraction of at least some alternating layers of LC molecules effectively converting Bragg reflector 450B into a mirror that prevents UV light 422-1 from reaching PhCh layer 412. Accordingly, with voltage 470-1, PhCh molecules 409-1 remain inactive and a throughput light 432-1 has substantially the same intensity as an input light 431. Thus, voltage 470-1 prevents PhCh layer 412 from obscuring a selected portion of pixelated shutter 400B, even in the presence of UV radiation 422. When a voltage 470-2 is reduced to zero, then Bragg reflector 450B is turned OFF, and becomes transparent to UV radiation 422-2, generating active PhCh molecules 409-2. Thus, a throughput light 432-2 may have a lower intensity than input light 431.

Figure 5A:
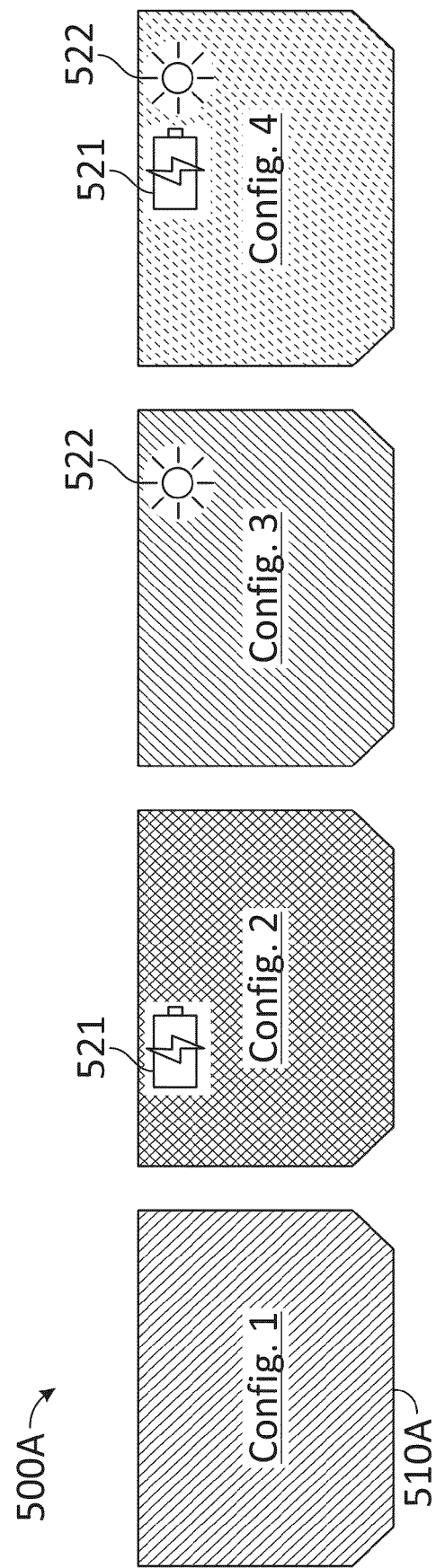
FIGS. 5A-5B illustrate the performance of a combined shutter under different conditions, according to some embodiments.
Figure 5B:
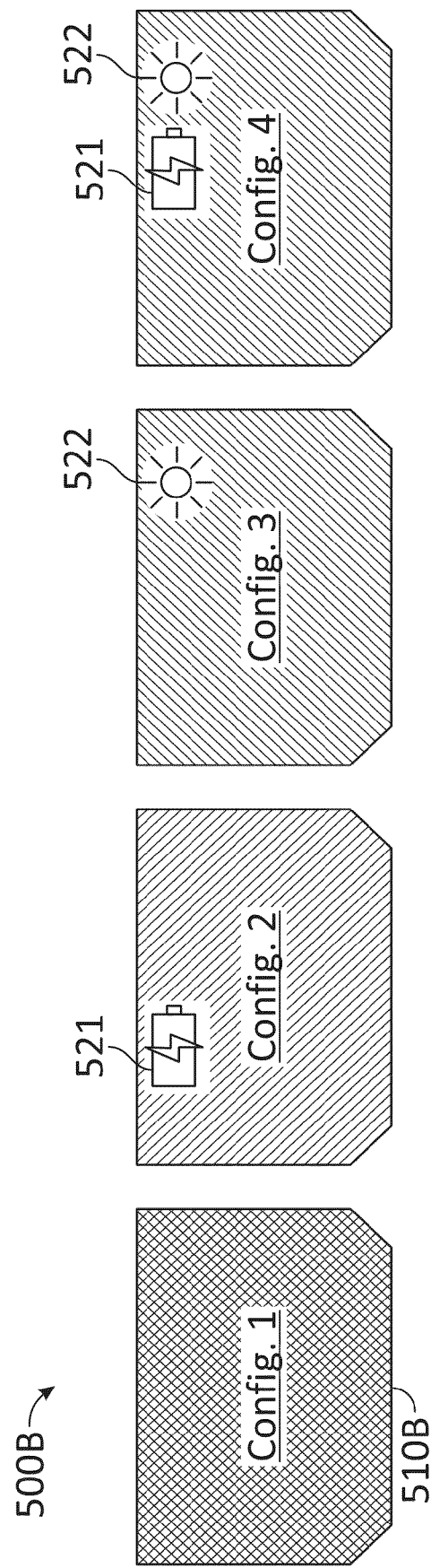

FIGS. 5A and 5B illustrate the performance of combined shutters 500A and 500B (hereinafter, collectively referred to as "combined shutters 500") under different configurations, according to some embodiments. The four configurations are as described elsewhere: Configuration 1: power OFF and absence of UV radiation. Configuration 2: power 521 ON and absence of UV radiation. Configuration 3: no power in the presence of UV radiation 522. And configuration 4, power 521 ON in the presence of UV radiation 522. The varying transparency levels are different between combined shutters 500 according to the different state of a "no electrical power" response of PhCh molecules and GHLC molecules in combined layers 510A and 510B, respectively.

Combined layer 510A includes both PhCh molecules and GHLC layers activated and dark under no electrical power and in the presence of UV radiation 521. To achieve this, some embodiments may include GH molecules oriented perpendicularly to the direction of an input light as default. Accordingly, in configuration 1, a transmission of about 50% may be used indoors for AR content enhancement. In configuration 2, a better transmission is achieved (about 90%), which can be desirable in many indoor applications of AR (LC molecules shift parallel to the direction of input light). A dark state with about 8% transmission can be achieved in configuration 3 (e.g., the PhCh molecules, when absorbing UV radiation, are oriented perpendicularly to input light per GH molecules, thus adding to the opacity of the combined layer). In configuration 4, GH molecules shift orientation parallel to the input light, increasing transparency up to about 30%, which may be desirable for moderate outdoor situations, or for returning indoors from a bright outdoors.

Combined layer 510B includes PhCh molecules activated and dark in the presence of UV radiation, and GHLC molecules configured to align with the input light (clear) with no electrical power. Accordingly, in configuration 1, a transmission of about 90% may be used in many indoor situations. In configuration 2, a transmission of about 50% can be used in some indoor applications of AR. A dark state with about 15% transmission can be achieved in configuration 3. Accordingly, the PhCh molecules absorb UV radiation and are oriented perpendicularly to the direction of incoming light, thus adding to the opacity of the combined layer. Configuration 3 may be desirable for outdoor use of AR headsets and smart glasses. In configuration 4, a similar transmission of about 15% is maintained (but in some embodiments with a better temperature stability and faster transition to a clear state).

Figure 6:
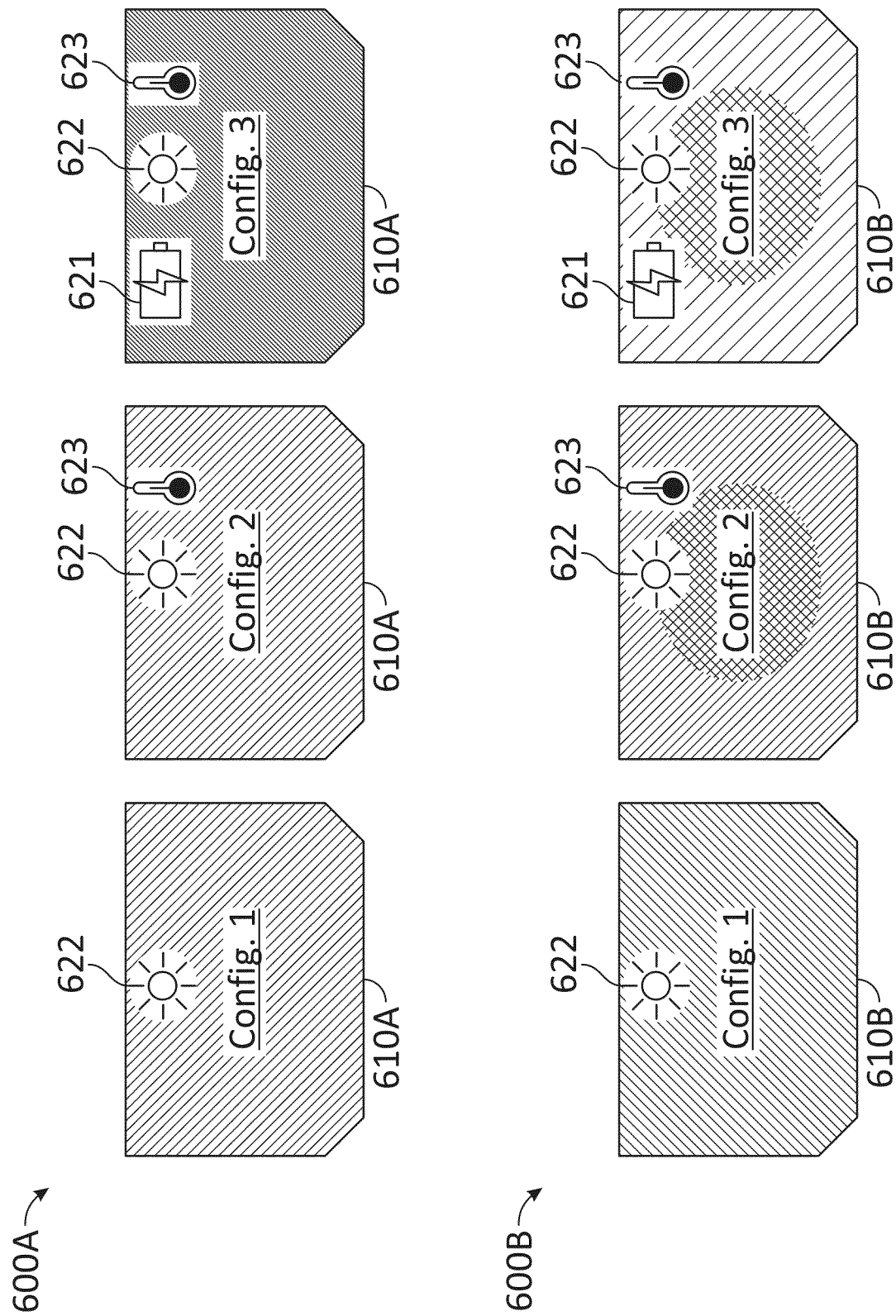
FIG. 6 illustrates a thermal response of combined shutters, according to some embodiments.

FIG. 6 illustrates a thermal response of combined shutter 600A and layered shutter 600B (hereinafter, collectively referred to as "shutters 600"), according to some embodiments. Shutters 600 may face different configurations of factors (or operation conditions) in active layers 610A and 610B (hereinafter, collectively referred to as "active layers 610"). Configuration 1 includes the presence of UV radiation 622 at room temperature (e.g., 25° C. or lower). Configuration 2 includes an increased temperature 623 in the presence of UV radiation 622. And configuration 3 includes a power 621 ON, in addition to increased temperature 623, in the presence of UV radiation 622.

In some embodiments, combined shutter 600A (at T~5° C.), with power 621 ON and in the presence of UV radiation 622, may take about sixty (60) seconds to darken to about 12% light transmission, and about twenty (20) minutes to reach a clear state after shutting down the power, in the absence of UV radiation 622. At 23° C., it takes about thirty (30) seconds to darken to a 30% or an 8% transmission, and about three (3) minutes to reach a clear state with no power and no UV radiation. And at 35° C., it takes about twenty (20) seconds to darken to a 16% transmission, and about one and a half (1.5) minutes to reach a clear state with no power and no UV.

In some embodiments, the timing performance of a layered shutter as disclosed herein may be as follows. A transition time between power 621 OFF to power 621 ON may take less than one hundred (100) milliseconds (ms) to reach approximately 50% light transmission. The reverse transition (e.g., from power 621 ON to power 621 OFF) takes about the same time to reach a 90% transmission. A transition between absence and presence of UV radiation 622 follows a Logistic curve behavior, with about thirty (30) seconds to achieve about 20% light transmission. The reverse transition between presence and absence of UV radiation 622 also follows a Logistic curve and may take about three (3) minutes to achieve 90% transmission. A transition between power 621 OFF with no UV radiation 622 and power 621 ON in the presence of UV radiation 622 may take about 100 ms to reach 50% light transmission and about thirty (30) seconds to reach about 11% transmission. A transition between power 621 ON, in the presence of UV radiation 622, and a power 621 OFF, in the absence of UV radiation 622, may take about one hundred (100) ms to reach 20% light transmission, and about three (3) minutes to reach 90% light transmission.

The temperature performance of layered shutter 600B may be as follows. At 5° C., it takes about sixty (60) seconds to darken to a 9% light transmission, and about thirty (30) minutes to reach a clear state with no power 621, in the absence of UV radiation 622. At 23° C. it takes about thirty (30) seconds to darken to a 20% or 11% transmission, and about five (5) minutes to reach a clear state with no power 621 in the absence of UV radiation 622. At T~35° C., it takes about twenty (20) seconds to darken to a 22% transmission, and about two (2) minutes to reach a clear state with no power 621 in the absence of UV radiation 622.

Figure 7:
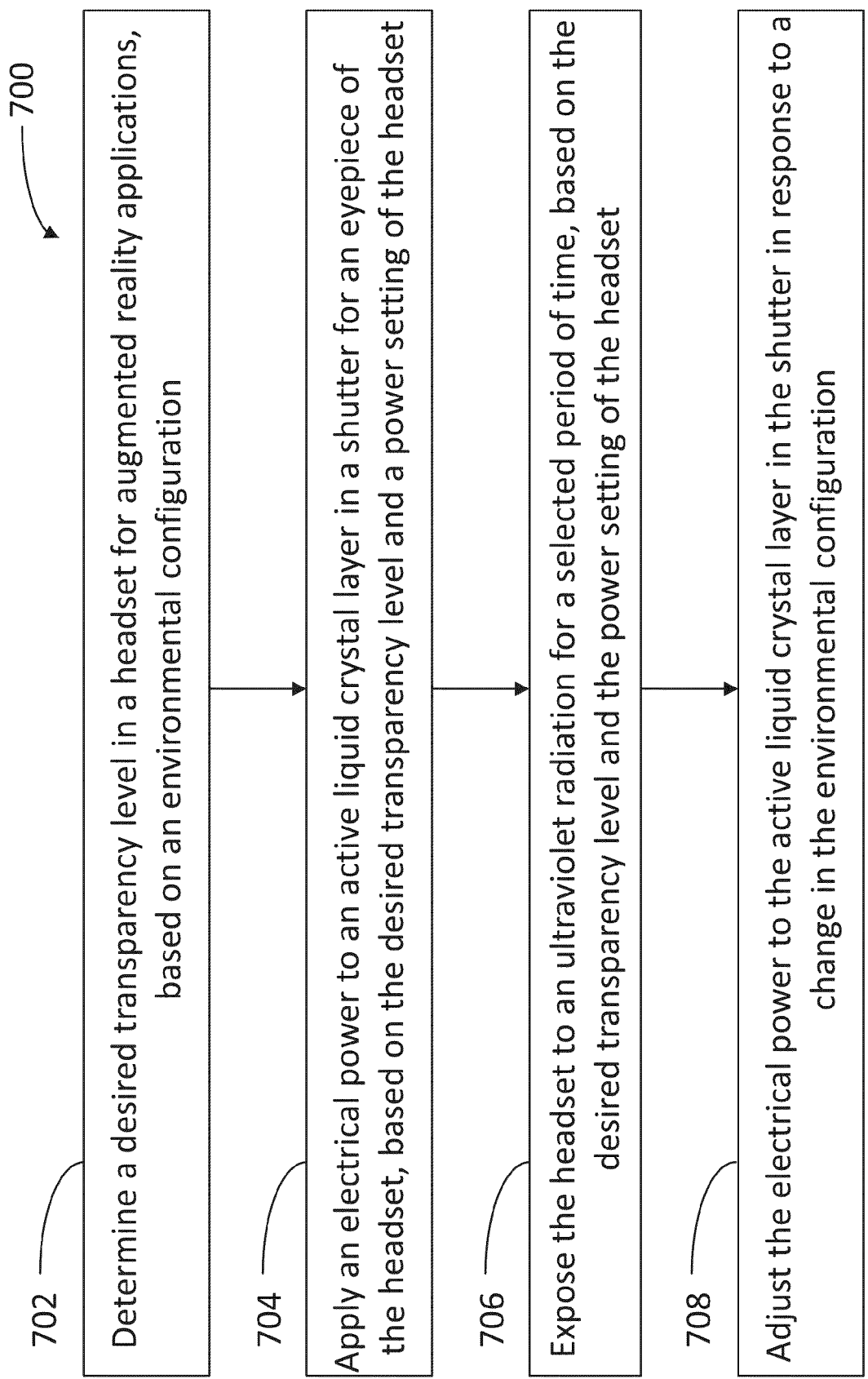
FIG. 7 is a flowchart illustrating steps in a method for dimming the eyepieces of an AR headset, according to some embodiments.

FIG. 7 is a flowchart illustrating steps in a method 700 for dimming the eyepieces of an AR headset, according to some embodiments. Accordingly, at least one or more of the steps in method 700 may be performed by a processor circuit executing instructions stored in a memory circuit within an enhanced reality device, headset, or smart glass, a computer, a mobile device, or a remote server, as disclosed herein (cf. processor 112, memory 120, headset 105, mobile device 110, and server 130). In some embodiments, at least some of the steps in method 700 may be performed by the mobile device or remote server wirelessly communicating with the enhanced reality device, headset, or smart glass using a communications module, directly or via a network (cf. communications module 118, network 150). Moreover, methods consistent with the present disclosure may include at least one or more of the steps in method 700 performed in a different order, simultaneously, quasi-simultaneously, or overlapping in time.

Step 702 includes determining a desired transparency level in a headset for augmented reality applications, based on an environmental configuration. In some embodiments, step 702 includes determining whether the headset is outdoors or indoors. In some embodiments, step 702 includes identifying a user gesture indicative of a desire to adjust a transparency level in the headset. In some embodiments, step 702 includes determining an amount of ultraviolet radiation present in the environmental configuration, and determining an amount of electrical power needed to achieve the desired transparency level based on a photochromic response of the shutter to the amount of ultraviolet radiation present.

Step 704 includes applying an electrical power to an active liquid crystal layer in a shutter for an eyepiece of the headset, based on the desired transparency level and a power setting of the headset. In some embodiments, the power setting of the headset indicates a fully charged battery, and step 704 includes applying an amount of electrical power above a threshold to adjust a transparency of the eyepiece to the desired transparency level within the selected period of time.

Step 706 includes exposing the headset to an ultraviolet radiation for a selected period of time, based on the desired transparency level and the power setting of the headset.

Step 708 includes adjusting the electrical power to the active liquid crystal layer in the shutter in response to a change in the environmental configuration. In some embodiments, step 708 includes determining the selected period of time based on an amount of ultraviolet radiation present, a temperature of the environmental configuration, and the power setting of the headset.

Some embodiments may include vibrating actuators disposed in close proximity to the skull, in a headset, taking advantage of acoustic propagation through bone to reach the audition neural network in the brain. Accordingly, users who have limited hearing may enjoy the audio of a media download.

Hardware Overview

Figure 8:
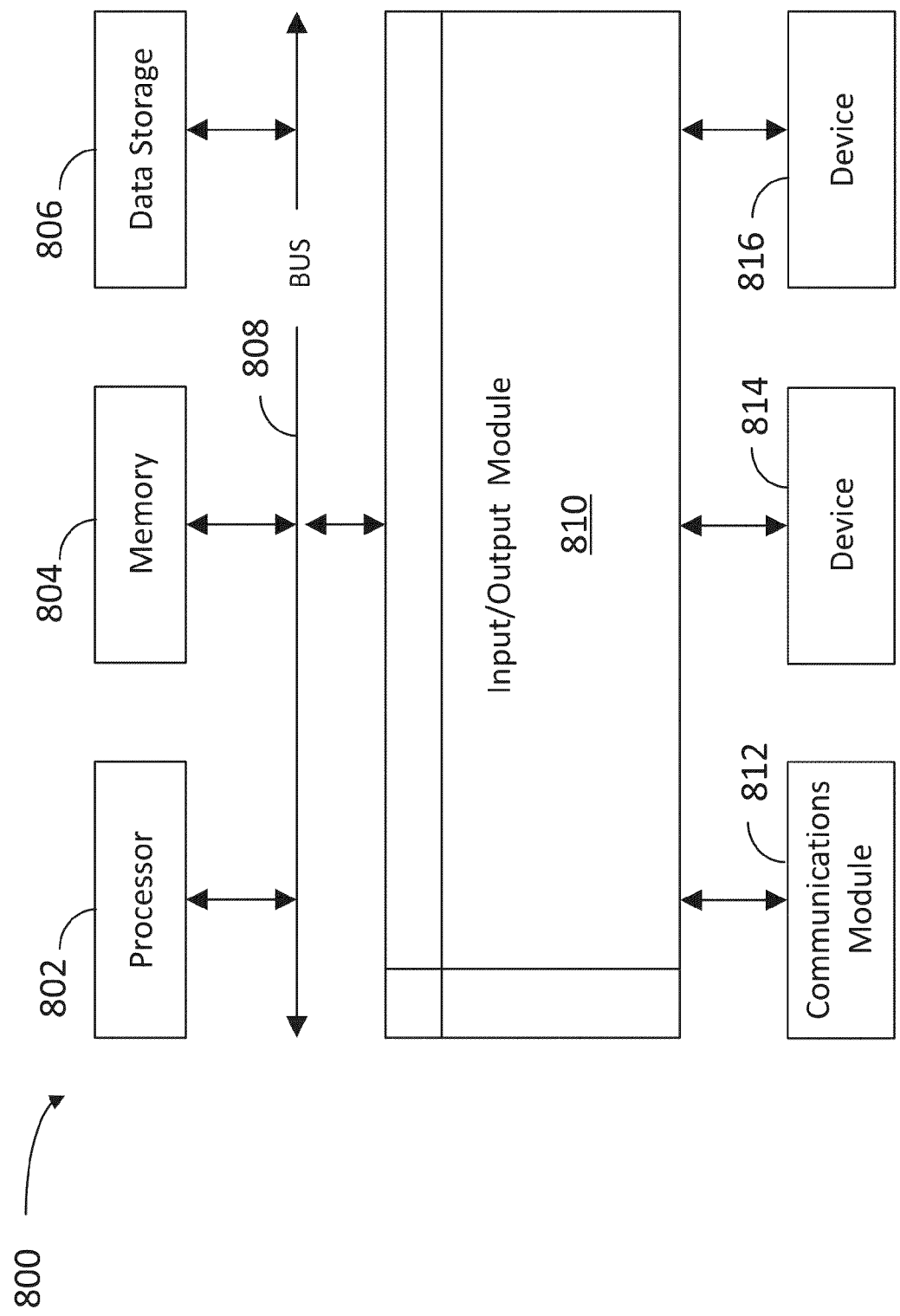
FIG. 8 is a block diagram illustrating an exemplary computer system with which the devices of FIG. 1, and the method 700 can be implemented, according to some embodiments.

FIG. 8 is a block diagram illustrating an exemplary computer system 800 with which the headset 105 of FIG. 1, and method 700 can be implemented, according to some embodiments. In certain aspects, computer system 800 may be implemented using hardware or a combination of software and hardware, either in a dedicated server, or integrated into another entity, or distributed across multiple entities. Computer system 800 may include a desktop computer, a laptop computer, a tablet, a phablet, a smartphone, a feature phone, a server computer, or otherwise. A server computer may be located remotely in a data center or be stored locally.

Computer system 800 includes a bus 808 or other communication mechanism for communicating information, and a processor 802 (e.g., processor 112) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled with bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, input/output module 810 is configured to connect to a plurality of devices, such as an input device 814 and/or an output device 816. Exemplary input devices 814 include a keyboard and a pointing device, e.g., a mouse or a trackball, by which a consumer can provide input to the computer system 800. Other kinds of input devices 814 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 816 include display devices, such as an LCD (liquid crystal display) monitor, for displaying information to the consumer.

According to one aspect of the present disclosure, AR headset 105 can be implemented, at least partially, using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A device, comprising:
   an active liquid crystal layer configured to adjust a transparency level according to an electrical power provided between two electrodes, the active liquid crystal layer including a host polymer oriented in a first direction and a liquid crystal polymer oriented in a second direction that is transversal to the first direction, when no electrical power is provided; and
   a photoactive layer configured to adjust the transparency level upon absorption of an ultraviolet radiation for a selected period of time.

2. The device of claim 1, wherein the active liquid crystal layer comprises a reconfigurable liquid crystal host and at least two types of oblong dye molecules, with at least one type of dye molecule reversibly changing color in a presence of ultraviolet light, and at least one type of dye molecule remaining unchanged in the presence of ultraviolet light.

3. The device of claim 1, wherein the active liquid crystal layer and the photoactive layer form a single layer oriented in a plane perpendicular to an optical path of an eyepiece in a headset for an augmented reality application.

4. The device of claim 1, wherein the active liquid crystal layer is adjacent and parallel to the photoactive layer and is perpendicular to an optical path of an eyepiece in a headset for an augmented reality application.

5. The device of claim 1, wherein the active liquid crystal layer and the photoactive layer form a pixelated tiling of a portion of an eyepiece in a headset for an augmented reality application.

6. The device of claim 1, wherein the active liquid crystal layer is configured in a clear state when the electrical power is absent.

7. The device of claim 1, wherein the active liquid crystal layer is configured in a dark state when the electrical power is absent.

8. A headset for augmented reality applications, comprising:

at least one eyepiece configured to provide a see-through image to a user via a transparent optical component, and to provide an artificial image through a display; and a dimming shutter configured to adjust a transparency level of the transparent optical component, the dimming shutter further comprising:

an active liquid crystal layer configured to adjust a transparency level according to an electrical power provided between two electrodes, the active liquid crystal layer including a host polymer oriented in a first direction and a liquid crystal polymer oriented in a second direction that is transversal to the first direction, when no electrical power is provided, and a photoactive layer configured to adjust the transparency level upon absorption of an ultraviolet radiation for a selected period of time.

9. The headset of claim 8, wherein the active liquid crystal layer comprises a reconfigurable liquid crystal host and at least two types of oblong dye molecules, with at least one type of dye molecule reversibly changing color in a presence of ultraviolet light, and at least one type of dye molecule remaining unchanged in the presence of ultraviolet light.

10. The headset of claim 8, wherein the active liquid crystal layer and the photoactive layer form a single layer oriented in a plane perpendicular to an optical path of the transparent optical component.

11. The headset of claim 8, wherein the active liquid crystal layer is adjacent and parallel to the photoactive layer and is perpendicular to an optical path of the transparent optical component.

12. The headset of claim 8, wherein the at least one eyepiece includes a display, and the active liquid crystal layer and the photoactive layer form a pixelated tiling of a portion of the display.

13. The headset of claim 8, wherein the active liquid crystal layer is configured in a clear state when the electrical power is absent.

14. The headset of claim 8, wherein the active liquid crystal layer is configured in a dark state when the electrical power is absent.

* * * * *